United States Patent
Albertz et al.

(10) Patent No.: US 12,358,348 B2
(45) Date of Patent: Jul. 15, 2025

(54) BEARING ASSEMBLY FOR SUPPORTING A UNIT OF A MOTOR VEHICLE ON A STRUCTURAL COMPONENT OF THE MOTOR VEHICLE

(71) Applicant: Bayerische Motoren Werke Aktiengesellschaft, Munich (DE)

(72) Inventors: Frank Albertz, Garmisch-Partenkirchen (DE); Peter Genender, Woerthsee (DE); Ulrich Theuersbacher, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/284,100

(22) PCT Filed: May 25, 2022

(86) PCT No.: PCT/EP2022/064311
§ 371 (c)(1),
(2) Date: Sep. 26, 2023

(87) PCT Pub. No.: WO2022/258389
PCT Pub. Date: Dec. 15, 2022

(65) Prior Publication Data
US 2024/0149646 A1 May 9, 2024

(30) Foreign Application Priority Data
Jun. 10, 2021 (DE) ...................... 10 2021 114 991.6

(51) Int. Cl.
*F16M 11/00* (2006.01)
*B60H 1/32* (2006.01)
*F16C 27/00* (2006.01)

(52) U.S. Cl.
CPC .......... *B60H 1/3229* (2013.01); *F16C 27/00* (2013.01)

(58) Field of Classification Search
CPC ..... B60H 1/3229; B60H 1/3223; F16C 27/00; B62D 21/09; B60K 25/00; B60K 2025/005; F16F 15/046
See application file for complete search history.

(56) References Cited

U.S. PATENT DOCUMENTS

| | | |
|---|---|---|
| 2,086,370 A | 7/1937 | Taub |
| 3,841,426 A | 10/1974 | Nemschoff |
| (Continued) | | |

FOREIGN PATENT DOCUMENTS

| | | |
|---|---|---|
| CA | 2249311 A1 | 9/1998 |
| DE | 2 358 103 A | 6/1974 |
| (Continued) | | |

OTHER PUBLICATIONS

U.S. Non-Final Office Action issued in U.S. Appl. No. 18/284,103 dated Jun. 20, 2024 (11 pages).

(Continued)

*Primary Examiner* — Amy J. Sterling
(74) *Attorney, Agent, or Firm* — Crowell & Moring LLP

(57) ABSTRACT

A bearing assembly for supporting a unit of a motor vehicle on a structural component of the motor vehicle includes four bearings with an elastic center. The four bearings are arranged on the structural component of the motor vehicle such that the elastic centers of the bearings together define a two-dimensional surface on which the center of mass of the unit to be supported is located.

11 Claims, 2 Drawing Sheets

(56) References Cited

U.S. PATENT DOCUMENTS

| | | | |
|---|---|---|---|
| 5,839,295 | A | 11/1998 | Lehmann |
| 7,018,102 | B1* | 3/2006 | Brotz ............... F16C 23/00 |
| | | | 384/582 |
| 9,045,029 | B2 | 6/2015 | Mair et al. |
| 10,048,599 | B2 | 8/2018 | Peijster |
| 2004/0172942 | A1* | 9/2004 | Gregory ............ F16F 15/046 |
| | | | 60/517 |
| 2007/0151819 | A1 | 7/2007 | Schmidt et al. |
| 2011/0085152 | A1 | 4/2011 | Nishino et al. |
| 2011/0210631 | A1* | 9/2011 | Siegl ............... F16C 27/00 |
| | | | 310/90.5 |
| 2014/0138171 | A1 | 5/2014 | Mair et al. |
| 2014/0190189 | A1 | 7/2014 | Kowsky et al. |
| 2014/0217664 | A1 | 8/2014 | Willems |
| 2015/0122452 | A1 | 5/2015 | Iino et al. |
| 2015/0122970 | A1 | 5/2015 | Platus |
| 2015/0369326 | A1* | 12/2015 | Modrezejewski ...... F16F 9/006 |
| | | | 188/267.1 |
| 2018/0339716 | A1* | 11/2018 | Tanaka ............ B61D 27/0018 |
| 2021/0080835 | A1* | 3/2021 | Jacobs ............ F16F 15/0232 |
| 2023/0332607 | A1 | 10/2023 | Shibata et al. |
| 2024/0175478 | A1 | 5/2024 | Albertz et al. |

FOREIGN PATENT DOCUMENTS

| | | |
|---|---|---|
| DE | 200 20 829 U1 | 3/2001 |
| DE | 697 13 579 T2 | 11/2002 |
| DE | 10 2011 080 037 A1 | 1/2013 |
| DE | 10 2018 131 998 A1 | 6/2020 |
| EP | 0 891 886 B1 | 6/2002 |
| JP | 9-123770 A | 5/1997 |
| JP | 9-150635 A | 6/1997 |
| WO | WO 2006/070558 A1 | 7/2006 |

OTHER PUBLICATIONS

International Search Report (PCT/ISA/210) issued in PCT Application No. PCT/EP2022/064311 dated Oct. 25, 2022 with English translation (4 pages).
German-language Written Opinion (PCT/ISA/237) issued in PCT Application No. PCT/EP2022/064311 dated Oct. 25, 2022 with English translation (8 pages).
German-language Search Report issued in German Application No. 10 2021 114 991.6 dated Mar. 22, 2022 with partial English translation (10 pages).
International Search Report (PCT/ISA/210) issued in PCT Application No. PCT/EP2022/064312 dated Oct. 25, 2022 with English translation (4 pages).
German-language Written Opinion (PCT/ISA/237) issued in PCT Application No. PCT/EP2022/064312 dated Oct. 25, 2022 with English translation (8 pages).
German-language Search Report issued in German Application No. 10 2021 114 994.0 dated Mar. 22, 2022 with partial English translation (10 pages).
Dahl., "Die Kopplungsfreie, Elastische Lagerung von Motoren mit Hilfe von Gummielementen", Dipl.-Ing. M. Dahl, Continental-Gummi-Werke A.G., 1969, pp. 266-271, vol. 8, (6 pages).
U.S. Notice of Allowance issued in U.S. Appl. No. 18/284,103 dated Nov. 13, 2024 (9 pages)

* cited by examiner

BEARING ASSEMBLY FOR SUPPORTING A UNIT OF A MOTOR VEHICLE ON A STRUCTURAL COMPONENT OF THE MOTOR VEHICLE

CROSS REFERENCE TO RELATED APPLICATION

This application contains subject matter related to U.S. application Ser. No. 18/284,103, entitled "Bearing Assembly for Supporting a Unit of a Motor Vehicle on a Structural Component of the Motor Vehicle," filed on Sep. 26, 2023.

BACKGROUND AND SUMMARY

The invention relates to a bearing assembly or a unit bearing for supporting a unit of a motor vehicle on a structural component of the motor vehicle, comprising four bearings with an elastic center.

Bearing assemblies for supporting a unit on a structural component of a motor vehicle are known in various embodiments from the prior art.

DE 10 2018 131 998 A1 describes a unit fastening device for fixing units to a vehicle body in an oscillatory manner. The unit fastening device comprises a first bearing part, a second bearing part and an elastic, oscillation-damping element. By means of the elastic, oscillation-damping element, forces which are introduced into the vehicle body by way of the unit fastening device are reduced. Here, the softer or more elastically deformable the design of the oscillation-damping element is, the better the damping action of the oscillation-damping element.

In the case of the unit fastening device known from DE 10 2018 131 998 A1, forces which result from a rotation of the unit, which are introduced into the vehicle body and which cause disturbing oscillations in the vehicle body are thus reduced in that a relative movement between the unit and the structural component is made possible.

However, limits are placed on the elasticity of the oscillation-damping element or on the relative movement of the unit with respect to the vehicle body in order to preclude the unit striking against the vehicle body in an undesired manner. Therefore, an achievable damping action of the unit fastening device known from DE 10 2018 131 998 A1 is restricted. In addition, small or damped forces already cause oscillations in the vehicle body which result in negative acoustics characteristics or disturbing noises of the vehicle body.

Proceeding from the unit fastening device known from DE 10 2018 131 998 A1, it is the object of the present invention to provide a bearing assembly for supporting a unit of a motor vehicle on a structural component of the motor vehicle, said bearing assembly securely supporting a unit and simultaneously eliminating or at least minimizing or reducing impacts of rotational movements of the unit on the acoustics characteristics of the structural component.

This object is achieved by means of the bearing assembly having the features of the independent claims.

According to the invention, a bearing assembly for supporting a unit of a motor vehicle, in particular an electric refrigerant compressor or air-conditioning compressor, on a structural component of the motor vehicle is thus provided. The bearing assembly comprises four bearings with an elastic center. The four bearings can be arranged on the structural component or on a subregion of the structural component in such a way that their elastic centers together span a planar or two-dimensional area in which a center of mass or a mass center point of the unit to be supported is located.

As a result of the bearing assembly according to the invention, in particular the arrangement of the bearings on the structural components, a secure support of the unit is thus provided. In addition, the arrangement of the bearings according to the invention makes it possible for forces caused by rotation of the unit to be introduced into the structural component in such a way that oscillations of the structural component which are produced by the introduced forces interfere in such a way that they cancel or balance one another out. The impacts of rotational movements of the unit on the acoustics characteristics of the structural component are thus eliminated or reduced to a minimum.

The term "elastic center" should be understood in the context of the present invention to mean that point of a body at which the elastic bearing axes of the body at least approximately intersect.

In a preferred embodiment of the bearing assembly according to the invention, the spanned two-dimensional area comprises two axes of symmetry.

The axes of symmetry may run orthogonally with respect to one another. The axes of symmetry may also intersect at the center of mass of the unit to be supported.

The four bearings may have the same bearing stiffness.

In an advantageous embodiment of the bearing assembly according to the invention, proceeding from an arrangement of the bearings in which the elastic centers span a two-dimensional area which comprises at least two axes of symmetry which run orthogonally with respect one another and which intersect at the elastic center of the unit, a first bearing of the bearings is arranged displaced in the direction of the center of mass of the unit or away from the center of mass of the unit. The bearing stiffness of the bearings is designed in such a way that oscillations of the vehicle structure that are produced by forces which are introduced into the vehicle structure by way of the bearing assembly and which result from a rotational movement of the unit cancel one another out.

If the first bearing is thus arranged displaced in the direction of the center of mass of the unit, the bearing stiffness of the first bearing is greater than the bearing stiffness of the other or further bearings. If, by contrast, the first bearing is arranged displaced away from the center of mass of the unit, that is to say the first bearing is further away, or is spaced apart further, from the center of mass of the unit than the further bearings, the bearing stiffness of the first bearing is smaller or lower than the bearing stiffness of the other bearings.

By means of the bearing stiffness, an asymmetry in the arrangement of the bearings is thus compensated in such a way that oscillations of the structural component which are caused by rotation of the unit and which are introduced into the structural component by way of the bearing assembly cancel or balance one another out.

In a preferred embodiment of the bearing assembly according to the invention, the bearing stiffness of the bearings is greater or stiffer the closer they are to the center of mass of the unit. This ensures that the bearing assembly affords a sufficient bearing security or the unit does not strike against the structural component in an undesired manner.

In an exemplary embodiment of the bearing assembly according to the invention, bearings which lie opposite one another in relation to the center of mass of the unit to be supported are attached to the same structural component, in particular to the same subregion of the structural component, of the motor vehicle.

In a preferred embodiment of the bearing assembly according to the invention, the bearings are attached to the same structural component, in particular to the same subregion of the structural component, of the motor vehicle.

That structural component of the motor vehicle or that subregion of the structural component of the motor vehicle on which the bearings are arranged is thus the same. Consequently, an acoustic transfer function or structural component sensitivity for all bearing points is also the same or at least similar, as a result of which a compensation effect of the oscillations of the structural component is ensured.

The structural component of the motor vehicle is for example a longitudinal member. The longitudinal member may comprise a U-shaped or rectangular profile. The longitudinal member may also have a hollow profile.

In a preferred embodiment, the bearing assembly according to the invention comprises at least two further bearings.

The sum of the bearings is, for example, an even number. A symmetrical configuration of the bearing assembly is thus possible.

The two-dimensional area spanned by the elastic centers is, for example, a rectangle, a square, a rhombus or a polygon with an even number of corners.

In an exemplary embodiment of the bearing assembly according to the invention, the bearings are sleeve bearings.

The bearings may be attached to the structural component by way of a rigid carrier structure. It is thus possible to adapt the bearing assembly to installation space conditions in a simple manner.

The carrier structure may have a stiffness which corresponds to the structural components.

The invention will be described in more detail below on the basis of an exemplary embodiment illustrated in the drawings.

DETAILED DESCRIPTION OF THE DRAWINGS

Figure 1:
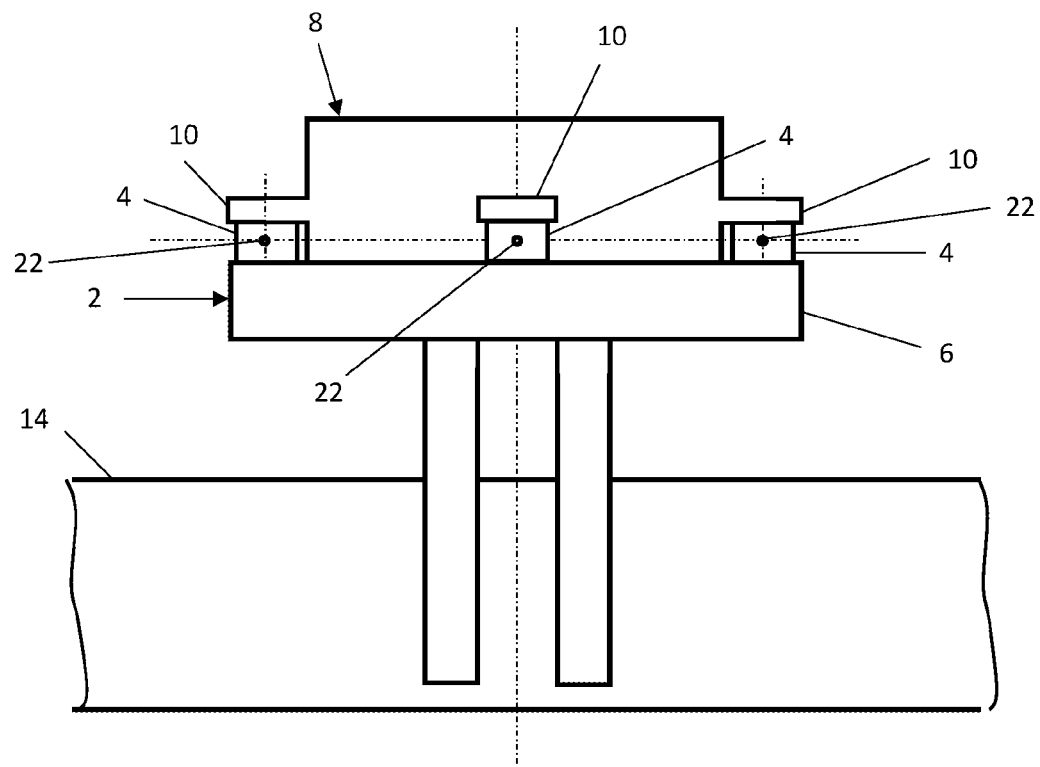
FIG. 1 is a side view of a schematic illustration of a bearing assembly according to an embodiment of the invention, which supports a unit of a motor vehicle on a structural component of the motor vehicle.
Figure 2:
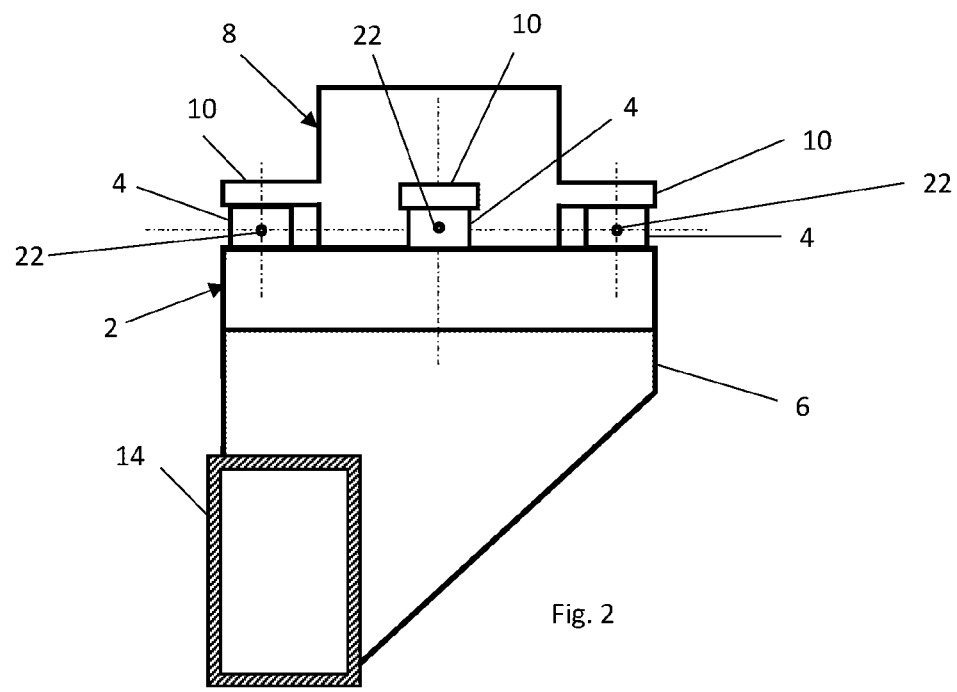
FIG. 2 is a front view of the schematic illustration of the bearing assembly from FIG. 1.

FIG. 1 and FIG. 2 show a bearing assembly 2 for supporting a unit 8 of a motor vehicle on a rigid longitudinal member 14 of the motor vehicle. The bearing assembly 2 comprises four bearings 4 with an elastic center 22, and also a carrier structure 6 for attaching the bearings 4 to the longitudinal member 14.

The unit 8 is an electric refrigerant compressor or an air-conditioning compressor.

The longitudinal member 14 is a rigid structural component of the vehicle body. As shown in FIG. 2, the longitudinal member 14 has a rectangular hollow profile.

The bearings 4 are arranged on the longitudinal member 14 by way of the carrier structure 6. The carrier structure 6 has a stiffness which corresponds to a stiffness of the longitudinal member 14.

The bearings 4 are sleeve bearings. The bearings 4 are connected to the unit 8 or support the unit 8 by way of projections 10 of the unit 8. The bearings 4 are attached to the longitudinal member 14 by way of the carrier structure 6 in such a way that the elastic centers 22 of the bearings 4 together span a two-dimensional area 20 in which a center of mass 12 of the supported unit 8 is located.

Figure 3:
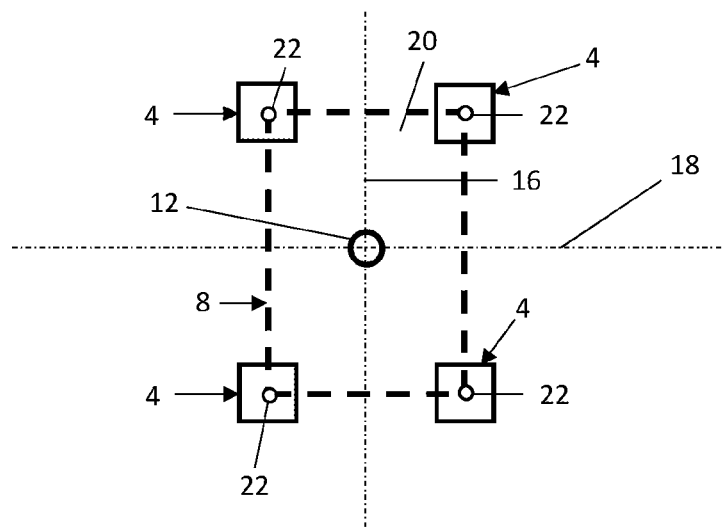
FIG. 3 is a schematic illustration of a two-dimensional area spanned by bearings of the bearing assembly from FIG. 1.

As is apparent in particular from FIG. 3, the spanned two-dimensional area 20 is a rectangle. The spanned two-dimensional area 20 comprises a first axis of symmetry 16 and a second axis of symmetry 18. The first axis of symmetry 16 and the second axis of symmetry 18 run orthogonally with respect one another and intersect at the center of mass 12 of the supported unit 8.

The bearings 4 which are arranged in a point-symmetrical manner or so as to lie opposite one another in relation to the center of mass 12 of the supported unit 8 have the same stiffness. In this way, the forces which are produced by rotation of the unit 8 and which are introduced into the longitudinal member 14 by way of the bearings 4 that are configured in a point-symmetrical manner with respect one another in relation to the center of mass 12 interfere with one another in such a way that they balance or cancel out. Impacts of a rotation of the unit 8 on the acoustics characteristics of the longitudinal member 14 are thus eliminated or reduced.

LIST OF REFERENCE DESIGNATIONS

2 Bearing assembly
4 Bearing
6 Carrier structure
8 Unit of a motor vehicle
10 Projection
12 Center of mass of the unit
14 Longitudinal member
16 First axis of symmetry
18 Second axis of symmetry
20 Two-dimensional area
22 Elastic center

The invention claimed is:

1. A bearing assembly for supporting a unit of a motor vehicle on a structural component of the motor vehicle, comprising:
   four bearings, each with an elastic center,
   wherein the four bearings are arrangeable on the structural component of the motor vehicle such that the elastic centers thereof together span a two-dimensional area in which a center of mass of the unit to be supported is located;
   wherein the spanned two-dimensional area comprises two axes of symmetry running orthogonally with respect to one another and intersecting at the center of mass of the unit to be supported;
   wherein the four bearings have a same bearing stiffness; and
   wherein the unit is connected directly to the structural component via the four bearings.

2. The bearing assembly according to claim 1, wherein respective ones of the four bearings which lie opposite one another in relation to the center of mass of the unit to be supported are attached to the same structural component of the motor vehicle.

3. The bearing assembly according to claim 1, wherein the four bearings are attached to the same structural component of the motor vehicle.

4. The bearing assembly according to claim 1, wherein a sum of the bearing locations is an even number.

5. The bearing assembly according to claim 1, wherein the two-dimensional area is a rectangle, a square, a rhombus or a polygon with an even number of corners.

6. A bearing assembly for supporting a unit of a motor vehicle on a structural component of the motor vehicle, comprising:

four bearings, each with an elastic center, wherein the four bearings are arrangeable on the structural component of the motor vehicle such that the elastic centers thereof together span a two-dimensional area in which a center of mass of the unit to be supported is located;

wherein the four bearings are arranged with their elastic centers spanning a two-dimensional area which comprises at least two axes of symmetry with respect to the unit, and which run orthogonally with respect to one another, and which intersect at the center of mass of the unit, wherein a first bearing of the four bearings is arranged, relative to the other bearings of the four bearings, displaced in the direction of the center of mass of the unit or away from the center of mass of the unit, wherein the bearing stiffness of the four bearings is designed such that oscillations of the vehicle structure that are produced by forces which are introduced into the vehicle structure by way of the bearing assembly and which result from a rotational movement of the unit cancel one another out; and wherein the unit is connected directly to the structural component via the four bearings.

7. The bearing assembly according to claim 6, wherein the bearing stiffness of the four bearings is greater the closer they are to the center of mass of the unit.

8. The bearing assembly according to claim 6, wherein respective ones of the four bearings which lie opposite one another in relation to the center of mass of the unit to be supported are attached to the same structural component of the motor vehicle.

9. The bearing assembly according to claim 6, wherein the four bearings are attached to the same structural component of the motor vehicle.

10. The bearing assembly according to claim 8, wherein a sum of the bearing locations is an even number.

11. The bearing assembly according to claim 6, wherein the two-dimensional area is a rectangle, a square, a rhombus or a polygon with an even number of corners.

* * * * *